Feb. 4, 1958 B. E. WALLACE ET AL 2,822,526
WAVEGUIDE SHUTTER
Filed March 24, 1954 2 Sheets-Sheet 1
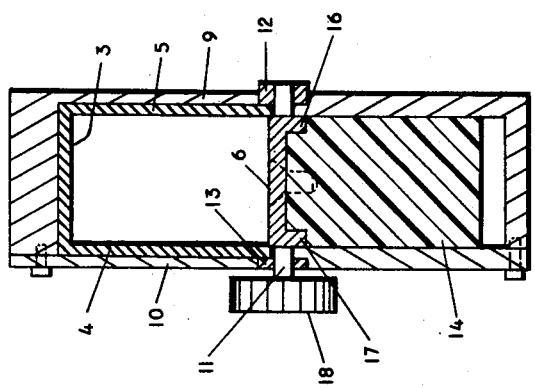
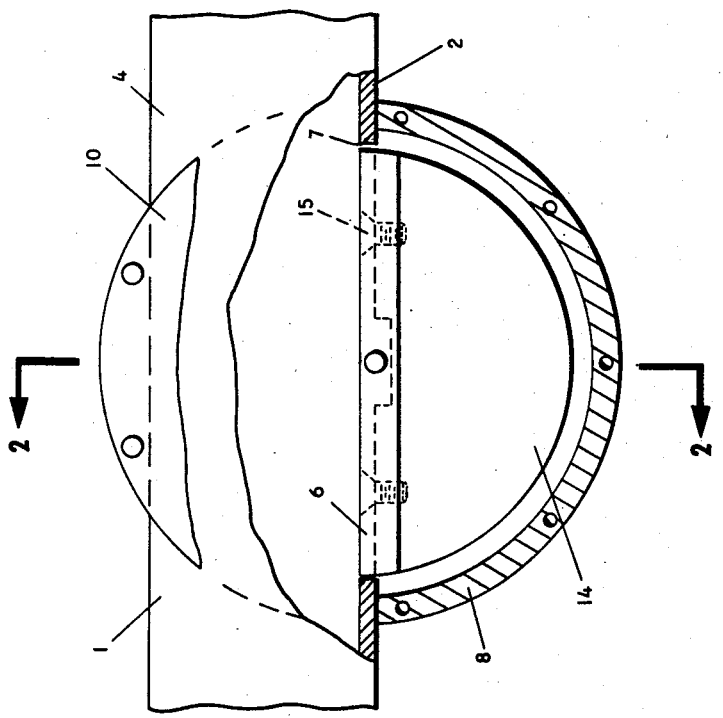
WILLIAM A. SCANGA
BERT E. WALLACE
INVENTOR.
BY Billy G. Corbon Feb. 4, 1958    B. E. WALLACE ET AL    2,822,526
WAVEGUIDE SHUTTER Filed March 24, 1954    2 Sheets-Sheet 2

WILLIAM A. SCANGA
BERT E. WALLACE

*INVENTORS*

BY

United States Patent Office 2,822,526
Patented Feb. 4, 1958

2,822,526
WAVEGUIDE SHUTTER

Bert E. Wallace, Towson, and William A. Scanga, Baltimore, Md., assignors to Aircraft Armaments, Inc., Baltimore, Md., a corporation of Maryland Application March 24, 1954, Serial No. 418,334

11 Claims. (Cl. 333—98)

This invention relates in general to power attenuators and more particularly to a waveguide shutter for producing a step change of attenuation of microwave energy flowing in a waveguide.

Conventional devices for attenuating the energy in a waveguide are of two basic types. One employs a reflective metal plate serving as a gate which is inserted into the waveguide transversely thereof to either partially or completely close the passage. The other employs a glass or phenolic plate having a resistive coating thereon which is inserted into the waveguide parallel to the passage. The maximum attenuation attainable with either of these types is approximately 50 decibels and the mechanical means for actuating the attenuating elements are relatively complex and bulky. Furthermore, conventional waveguide attenuators unavoidably decrease the efficiency of a waveguide by introducing abrupt impedance changes within the section.

An object of the instant invention is to provide a waveguide shutter which will give a step change of attenuation of well over 80 decibels and which in the open position has an insertion loss less than 0.3 decibel.

Another object of this invention is to provide a waveguide shutter employing a flange on a movable wall portion of a waveguide in combination with a block of electrical energy absorbing material for effecting high attenuation of the energy in the waveguide while maintaining the standing wave ratio in the guide at a value less than 1.1 over a 10 percent frequency band when the shutter is in the open position.

Another object of this invention is to provide a fast acting waveguide shutter which is mechanically simple to actuate, which is rugged and which occupies a relatively small space.

Still another object of this invention is to provide a waveguide shutter which is economical to manufacture.

Further and other objects will become apparent from a reading of the following detail description, especially when considered in combination with the accompanying drawing, wherein like numerals refer to like parts.

In the drawing:

Fig. 1 is a fragmentary top elevation view of the waveguide shutter.

Fig. 2 is a sectional view taken on line 2—2 of Fig. 1.

Figure 3:
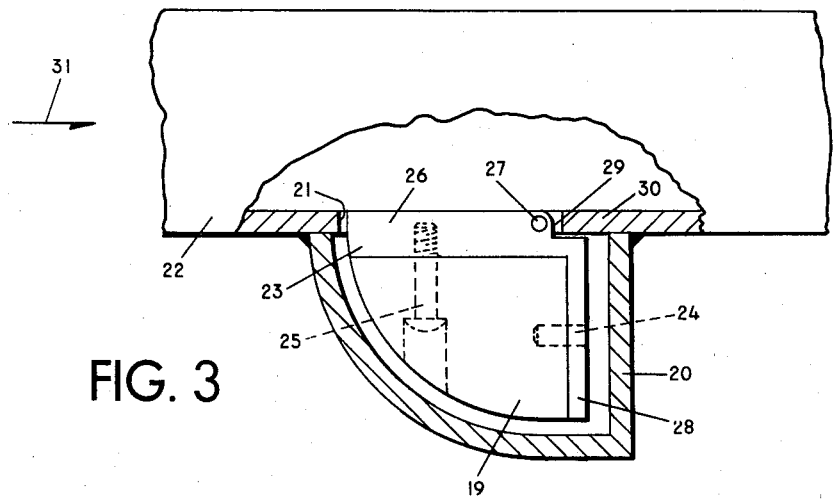
Fig. 3 is a fragmentary top elevation view of a modified form of the shutter shown in the open position.

Referring to Figs. 1 and 2, a section of rectangular waveguide 1 is shown having a pair of narrow walls 2 and 3, and a pair of wide walls 4 and 5 wherein microwave energy applied to the waveguide will flow through the passage defined by the four walls. A segment 6 of narrow wall 2 is cut from the waveguide to provide a generally rectangular opening 7, the length of which is equal to substantially twice the wide dimension of the waveguide and the width of which is equal to the narrow dimension of the waveguide.

A tubular metal housing 8 slightly larger in diameter than the length of opening 7 and having a transverse slot formed therein for receiving the waveguide is arranged relative to opening 7 such that the centerline of housing 8 is located medially of the opening and coincident with the plane of wall 2. A pair of generally circular metal end plates 9 and 10 are secured to housing 8 for rigidly connecting the latter to the waveguide and for forming a closed semicircular cavity in communication with opening 7. End plates 9 and 10 are contiguous with wide walls 4 and 5 and have a step increase in thickness beyond narrow wall 2 as best shown in Fig. 2 so that the height of the cavity will be substantially the same as the narrow inside dimension of the guide.

Segment 6 is carried by housing 8 to serve as a revolving door for closing opening 7. Specifically, this is accomplished by a shaft 11 secured to segment 6 medially thereof and extending transversely of the waveguide and parallel with the plane of the segment. Shaft 11 is mounted in suitable bearings 12 and 13 carried by end plates 9 and 10 respectively.

A block 14 of suitable microwave energy absorbing material such as "polyiron," having a semicircular planform shape and a thickness substantially equal to the narrow dimension of the waveguide is secured at its base to the outside surface of segment 6 by means such as screws 15. As shown in the drawing, by rotating segment 6 from the open position shown in Fig. 1 to a new position 180° disposed therefrom, block 14 will be inserted into waveguide 1, completely blocking the passage. Continued rotation of segment 6 throughout a second 180° segment will return block 14 to the original position within the cavity formed by housing 8 and open the waveguide passage to allow the free flow of energy therethrough. With the shutter in this latter open position segment 6 closes opening 7 in the side of waveguide 1 except for the small gap required to permit unobstructed rotational movement of the segment and its associated block 14. Due to the manner in which energy flows through the waveguide, the gaps extending in a direction parallel to the guide will normally tend to produce a power loss and set up an undesirable standing wave in the area of the shutter as a result of energy leakage therethrough into housing 8. This undesirable effect is obviated through the use of transverse flanges 16 and 17 formed on the outer edges of segment 6. These flanges 16 and 17 extend outwardly and generally parallel with end plates 9 and 10 to produce a very low impedance path for the waveguide energy such that the effect of the gap is substantially eliminated. That is, energy in the waveguide will flow as though no gap were present. For most satisfactory results the width of the flanges 16 and 17 should be at least ⅛ of the wave length of the energy flowing in the waveguide and preferably their width should be in the neighborhood of ¼ of a wave length.

The amount of attenuation of microwave energy in a waveguide through the use of an absorbing material such as "polyiron" is directly proportional to the quantity of absorption material inserted in the guide. For this reason, block 14 is made semicircular with a diameter at its base substantially equal to the length of segment 6 to provide the maximum quantity of absorption material for insertion in the guide while allowing unobstructed rotation of segment 6.

Figure 4:
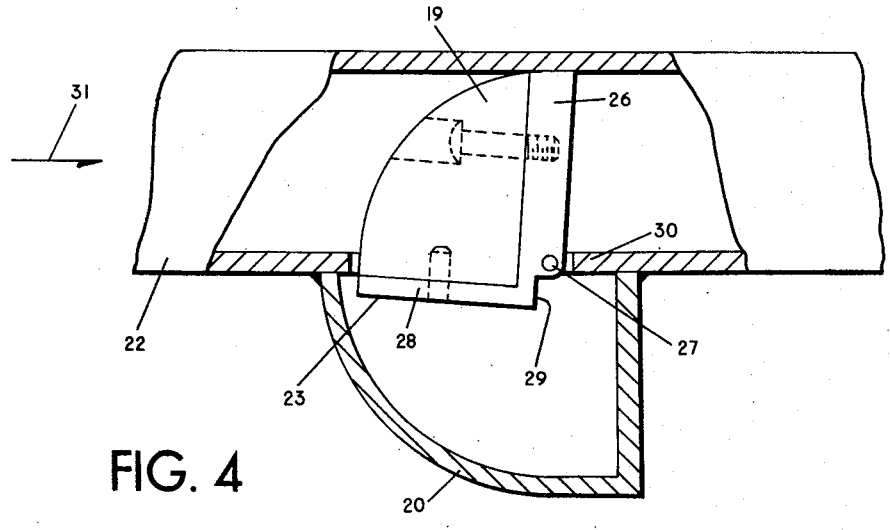
Fig. 4 is a fragmentary top elevation view of the modified shutter shown in the closed position.

A modification of the waveguide shutter shown in Figs. 1 and 2 is shown in Figs. 3 and 4 wherein the block of energy absorbing material 19 has a planform shape which is approximately a 90° segment of a circle. This configuration, while not providing as large a quantity of absorbing material for attenuating the energy in the waveguide, operates very efficiently, particularly at the lower microwave frequencies, because energy leakage into shutter housing 20, when the shutter is in the closed position as shown in Fig. 4, can be more effectively eliminated. In the modified shutter, the length of opening 21 in the narrow side of waveguide 22 is substantially equal to the wide dimension of the waveguide. The block of energy absorbing material 19 is secured to an L-shaped metal base 23 by means of a positioning dowel 24 and a bolt 25 which threadedly engages leg 26 of base 23. The base is swingably carried by a shaft 27 for free movement between the open and closed positions shown in Figs. 3 and 4, respectively, for selectively attenuating the energy traveling in the waveguide in the direction indicated by arrow 31. Shaft 27 is secured to leg 26 and spaced from the point of intersection of leg 26 with the other leg 28 of base 23 so that when the shutter is rotated approximately 90°, to the closed position, leg 28 is spaced from the waveguide as shown in Fig. 4. This avoids the possibility of leg 28 contacting waveguide 22 even with large dimensional tolerances and fills opening 21 with absorbing material to effectively prevent energy leakage around the shutter through housing 20.

Leg 26 of base 23 serves to close opening 21 in the narrow wall of the waveguide when the shutter is in the open position in the same manner that segment 6 closes opening 7 in the configuration shown by Figs. 1 and 2. Instead of using flanges as segment 6 does to negative the effects of the gaps by producing a low impedance path, base 23 is made sufficiently thick to serve the same function without the use of flanges.

A rectangular notch 29 is formed in base 23 at the point of intersection of the legs 26 and 28 which allows waveguide wall 30 to serve as a stop to limit the movement of the shutter and also to reduce the air gap between the waveguide and the shutter when the latter is in the open position.

The operation of the waveguide shutter shown in Figs. 1 and 2 is believed obvious from a reading of the foregoing description. When the shutter is in the open position shown in the drawing, energy will flow through the waveguide with substantially the same efficiency as with a continuous guide having no discontinuities. When it is desired to stop the flow of energy through the waveguide, actuation of a pinion drive means 18 is effected to cause rotation of segment 6 through shaft 11 for a full 180° causing the block of energy absorption material 14 to be inserted in the waveguide passage. The energy flowing in the guide thus contacts the absorption material which causes a very high dissipation of such energy to produce an attenuation in the power level of well over 80 decibels. To again allow the transmission of energy through the waveguide it is only necessary to rotate segment 6 through a second 180° segment to position the absorbing material outside the waveguide and close opening 7.

The operation of the shutter shown in Figs. 3 and 4 is similar to that previously described for the configuration shown by Figs. 1 and 2, except that maximum attenuation is obtained with only 90° of shutter rotation.

It is to be understood that certain alterations, modifications and substitutions may be made to the instant disclosure without departing from the spirit and scope of this invention as defined by the appended claims.

We claim:

1. A waveguide shutter for attenuating microwave energy flowing in a waveguide comprising, a rectangular waveguide defining a hollow passage for the transmission of microwave energy, said waveguide having a pair of narrow and a pair of wide walls, one of said narrow walls having a segment thereof rotatable relative to the waveguide about an axis located medially of the segment and arranged generally parallel with said narrow wall and transversely of said waveguide, said segment having an inner and outer surface and a length no greater than substantially twice the wide dimension of said waveguide whereby rotation of the segment is unobstructed by said waveguide, a semicircular block of microwave absorbing material secured at its base to the outer surface of the waveguide segment, the thickness of said semicircular block being substantially equal to the width of said narrow walls, and means connecting with said waveguide segment for rotating the latter to insert said absorbing material into said waveguide for attenuating the microwave energy flowing therein.

2. A waveguide shutter for attenuating microwave energy flowing in a waveguide comprising, a section of rectangular waveguide, said waveguide having a generally rectangular opening formed in one wall thereof, the length of said opening being substantially twice the width of the walls adjoining said one wall, the width of said opening being substantially equal to the width of said one wall, a generally rectangular metallic plate substantially the size of said opening carried by said waveguide for closing said opening, said metallic plate being rotatable about an axis located medially of said plate and arranged generally parallel with said one wall and normal to said waveguide, a semicircular block of microwave absorbing material secured to one side of said plate, and means for rotating said plate whereby said absorbing material is removably inserted into said waveguide for closing the same and attenuating the energy flowing therein.

3. A waveguide shutter for attenuating microwave energy flowing in a waveguide comprising, a rectangular waveguide defining a hollow passage for the transmission of microwave energy, a semicircular block of microwave absorbing material secured to one wall of said waveguide on the exterior thereof, the radius of said block being substantially equal to the width of the adjoining walls, the thickness of said block being substantially equal to the width of said one wall, the portion of said one wall contiguous with said semicircular block being rotatable relative to said waveguide about an axis located medially of said portion and arranged parallel with said one wall and normal to said waveguide for selectively inserting said absorbing material into said waveguide to attenuate the energy flowing therein, and means connecting with said portion of the waveguide for rotating the same.

4. A waveguide shutter for attenuating microwave energy flowing in a waveguide defining a hollow passage for the transmission of microwave energy, said waveguide having an opening formed in one wall thereof, a metallic plate swingably carried by said waveguide for closing said opening and effectively forming an uninterrupted path for the flow of electrical energy within the waveguide, a block of microwave absorbing material secured to said plate on the exterior surface thereof, and means for swinging said plate whereby said absorbing material is inserted within said waveguide for attenuating the flow of energy therethrough.

5. A waveguide shutter for attenuating microwave energy flowing in a waveguide comprising, a generally rectangular waveguide having a pair of narrow and a pair of wide walls, a segment of one of the narrow walls being rotatable relative to said waveguide about an axis located medially of said segment and arranged generally parallel to said narrow walls and transversely of said waveguide, said segment being substantially rectangular in shape wherein the length thereof is twice the width of said wide walls and the width thereof is substantially equal to the width of said narrow walls, laterally extending flanges formed on said segment at the longitudinal edges thereof for substantially eliminating the electrical discontinuity in the waveguide caused by the gaps between said segment and the adjacent waveguide walls, and a block of microwave energy absorbing material secured to said segment on one side thereof contiguous with said flanges for movement into and out of said waveguide in response to rotation of said segment for selectively attenuating the microwave energy flowing in the waveguide.

6. A waveguide shutter for attenuating microwave energy in a waveguide comprising, a hollow waveguide for conducting microwave energy, said waveguide having an opening formed therein, a door swingably carried by said waveguide for closing said opening, a housing secured to said waveguide and forming an enclosed cavity contiguous with said door, a block of microwave energy absorbing material secured to the outer surfaces of said door within said cavity, means for selectively swinging said door from a position allowing transmission of energy through said waveguide to an attenuating position inserting said block of absorbing material into said waveguide, and flanges projecting laterally from said door and cooperating with said housing for minimizing the electrical discontinuity between said door and said waveguide.

7. A waveguide shutter for attenuating microwave energy in a waveguide comprising, a generally rectangular waveguide defining a hollow passage for the transmission of microwave energy, said waveguide having a pair of narrow and a pair of wide walls, one of said narrow walls having a segment rotatable relative to the waveguide about an axis located medially of the segment and arranged generally parallel with said narrow wall and transversely of said waveguide, said segment having inner and outer surfaces and a length substantially equal to twice the wide dimension of said waveguide, a semicircular block of microwave energy absorbing material secured at its base to the outer surface of said segment, the thickness of said block being substantially equal to the narrow dimension of said waveguide and the radius thereof being substantially equal to the wide dimension of said waveguide whereby rotation of said segment a half revolution will position said block within said waveguide and close said passage to attenuate the flow of energy therethrough, wall projections carried by said waveguide and projecting outwardly adjacent said segment in a direction generally parallel with said wide walls, and laterally extending flanges carried by said segment on the outer surface thereof and cooperating with said wall projections to minimize the electrical discontinuity between said segment and the adjacent waveguide walls, the width of said projections and flanges being at least ⅛ of the wave length of the energy in the waveguide.

8. A waveguide shutter for attenuating microwave energy in a waveguide comprising, a generally rectangular waveguide defining a hollow passage for the transmission of microwave energy, said waveguide having a pair of narrow and a pair of wide walls, one of said narrow walls having a segment rotatable relative to the waveguide about an axis located medially of the segment and arranged generally parallel with said narrow wall and transversely of said waveguide, said segment having inner and outer surfaces and a length no greater than twice the wide dimension of said waveguide, a semicircular block of microwave energy absorbing material secured at its base to the outer surface of said segment, the thickness of said block being substantially equal to the narrow dimension of said waveguide and the radius thereof being no greater than the wide dimension of said waveguide whereby said segment may be freely rotated to position said block within said waveguide to close said passage and attenuate the flow of energy therethrough, a housing carried by said waveguide and forming a closed cavity adjacent said segment for receiving said block of energy absorbing material, and laterally extending flanges carried by said segment on the outer surface thereof for cooperating with said housing to minimize the electrical discontinuity caused by the gap between said segment and said waveguide.

9. A waveguide shutter for attenuating microwave energy in a waveguide comprising, a hollow rectangular waveguide for conducting microwave energy having a pair of narrow and a pair of wide walls, one of said narrow walls having an opening formed therein, the width of which is substantially equal to the narrow dimension of said waveguide and the length of which is at least equal to the wide dimension of said waveguide, a door swingably carried by said waveguide for closing said opening, a housing secured to said waveguide and forming an enclosed cavity contiguous with said door, a block of microwave energy absorbing material secured to the outer surface of said door within said cavity, and means for selectively swinging said door from a position closing said opening and allowing transmission of energy through said waveguide to an attenuating position closing said opening and inserting said block of absorbing material into said waveguide.

10. A waveguide shutter for attenuating microwave energy in a waveguide comprising, a hollow rectangular waveguide for conducting microwave energy having a pair of narrow and a pair of wide walls, one of said narrow walls having an opening formed therein, the width of which is substantially equal to the narrow dimension of said waveguide and the length of which is at least equal to the wide dimension of said waveguide, a door swingably carried adjacent one end thereof by said waveguide for closing said opening, a housing secured to said waveguide and forming an enclosed cavity contiguous with said door, the thickness of said door adjacent the longitudinal edges thereof being at least ⅛ of the wave length of the energy flowing in the waveguide to effectively close the air gap of the opening between said door and said waveguide, a block of microwave absorbing material secured to the outer surface of said door within said cavity, the width of said block of absorbing material as measured perpendicular to the plane of said door tapering from a maximum adjacent one end of said door to a minimum adjacent the opposite end thereof whereby inward swinging movement of said door will freely admit said block of absorbing material into the waveguide passage through said opening, the thickness of said block of absorbing material being substantially equal to the narrow dimension of said waveguide whereby movement thereof into the waveguide passage by rotating said door will substantially completely close both the waveguide passage and the opening for attenuating microwave energy, nad actuating means connecting with said door for selectively swinging the same from a position closing said opening and allowing transmission of energy through said waveguide to an attenuating position closing said opening and inserting said block of absorbing material into said waveguide.

11. A waveguide shutter for attenuating microwave energy in a waveguide comprising, a hollow rectangular waveguide for conducting microwave energy having a pair of narrow and a pair of wide walls, one of said narrow walls having an opening formed therein, the width of which is substantially equal to the narrow dimension of said waveguide and the length of which is at least equal to the wide dimension of said waveguide, a door for closing said opening, a hinge carried by said door and spaced from either end thereof a distance no greater than the wide dimension of said waveguide and connecting with said waveguide for allowing swinging movement of the door into the waveguide passage, a housing secured to said waveguide and forming an enclosed cavity contiguous with said door, a block of microwave absorbing material secured to the outer surface of said door within said cavity, the maximum radial length of said block as measured from the axis of said hinge being no greater than the wide dimension of said waveguide whereby inward swinging movement of said door will freely admit said block of absorbing material into the waveguide passage through said opening, the thickness of said block of absorbing material being substantially equal to the narrow dimension of said waveguide whereby movement thereof into the waveguide passage by rotating said door will substantially completely close both the waveguide passage and the opening for attenuating microwave energy, and actutaing means connecting with said door for selectively swinging the same from a position closing said opening and allowing transmission of energy through said waveguide to an attenuating position closing said opening and inserting said block of absorbing material into said waveguide.

References Cited in the file of this patent

UNITED STATES PATENTS

| | | |
|---|---|---|
| 2,588,934 | Miller | Mar. 11, 1952 |
| 2,629,048 | Dyke et al. | Feb. 17, 1953 |
| 2,646,551 | Roberts | July 21, 1953 |